(12) United States Patent
Nakano

(10) Patent No.: US 6,611,307 B2
(45) Date of Patent: Aug. 26, 2003

(54) LIQUID CRYSTAL DISPLAY HAVING TWO ALIGNMENT DOMAINS, MASK, AND METHOD THEREOF

(75) Inventor: Hiroki Nakano, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 09/681,468

(22) Filed: Apr. 12, 2001

(65) Prior Publication Data

US 2001/0043300 A1 Nov. 22, 2001

(30) Foreign Application Priority Data

Apr. 14, 2000 (JP) ....................................... 2000-114332

(51) Int. Cl.[7] ............................................ G02F 1/1337
(52) U.S. Cl. ........................ 349/129; 349/128; 349/126
(58) Field of Search ................................. 349/123, 128, 349/129, 191, 126

(56) References Cited

U.S. PATENT DOCUMENTS

| 5,594,570 A | * | 1/1997 | Hirata et al. ................. 349/129 |
| 5,777,700 A | * | 7/1998 | Kaneko et al. ................ 349/39 |
| 5,801,802 A | * | 9/1998 | Inoue et al. ................. 349/129 |
| 5,831,704 A | * | 11/1998 | Yamada et al. ............. 349/124 |

FOREIGN PATENT DOCUMENTS

| JP | 5-232441 | 9/1993 | ........... G02F/1/133 |
| JP | 8-101390 | 4/1996 | ......... G02F/1/1337 |

* cited by examiner

Primary Examiner—Robert H. Kim
Assistant Examiner—Andrew Schechter
(74) Attorney, Agent, or Firm—Derek S. Jennings

(57) ABSTRACT

A liquid crystal display includes an alignment film having first alignment subdomains with a first alignment property and second alignment subdomains with a second alignment property different from the first one. In the alignment film, the first alignment subdomains and the second alignment subdomains are arranged in a matrix so that both of them are included in every line extending across the matrix.

4 Claims, 7 Drawing Sheets

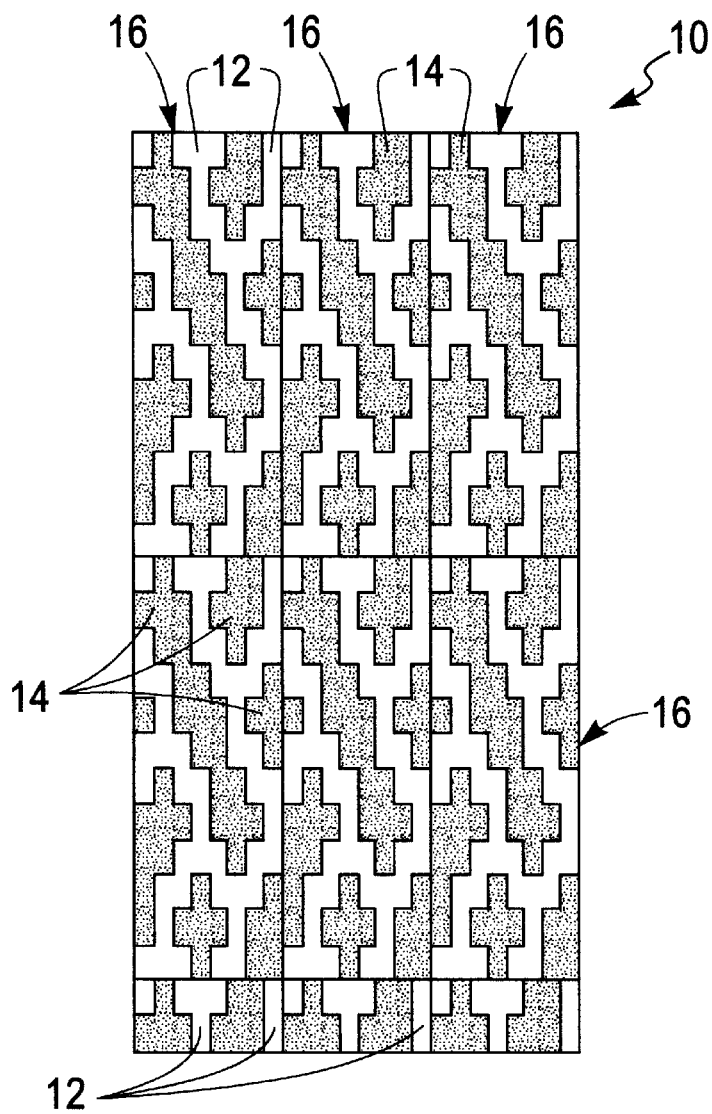
Fig. 1A
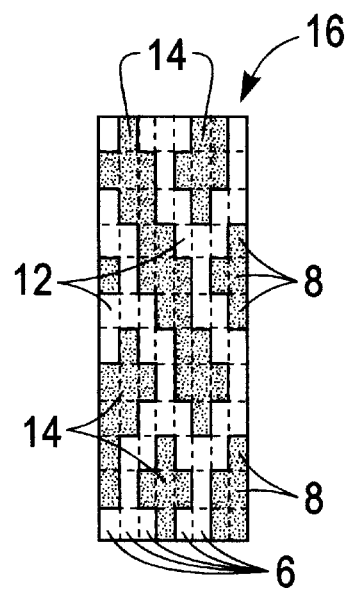
Fig. 1B
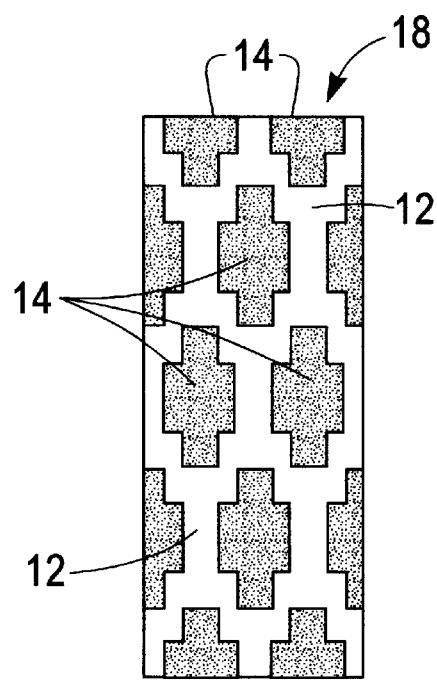
Fig. 2A
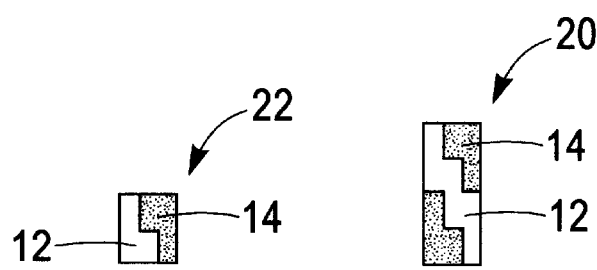
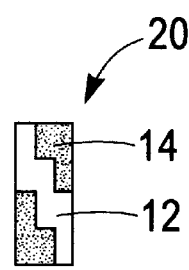
Fig. 2C    Fig. 2B Viewing angle of liquid crystal panel Viewing angle characteristic of single-domain LCD (reverse tilt)

Viewing angle characteristic of two-domain LCD

Page header US 6,611,307 B2 omitted.

LIQUID CRYSTAL DISPLAY HAVING TWO ALIGNMENT DOMAINS, MASK, AND METHOD THEREOF

BACKGROUND OF INVENTION

1. Field of the Invention

The present invention relates to a liquid crystal display, mask and method for producing the liquid crystal display. More particularly, the present invention relates to a liquid crystal display having an improved viewing angle characteristic and a method for producing the same.

2. Description of Related Art

In general, contrast and color of a liquid crystal display (LCD) depend on its viewing angle, which is called a viewing angle dependence. One technique to widen a viewing angle of an LCD is to form two types of alignment domains having different alignment properties in an alignment film. For example, as shown in FIG. 9, alignment domains 2 and 3 are formed in a resin film 1 on a lower substrate using this technique. In the alignment domain 2, molecules are oriented in a predetermined direction at a predetermined pretilt angle, and in the alignment domain 3, molecules are oriented in a direction 180-degree different from the molecular orientation in the alignment domain 2 at the predetermined pretilt angle.

An example of the alignment film 4 having the alignment domains 2 and 3 is disclosed in Japanese unexamined Patent Publication No. 05-232441. The Japanese patent publication discloses that alignment domains (A) 2 and (B) 3 are arranged in a checkered pattern on a pixel by pixel basis, as shown in FIG. 10. In accordance with the invention, since a vertical or horizontal line is displayed on a screen of an LCD using the alignment domains (A) 2 and (B) 3 having different alignment properties, the viewing angle of the line can be widened. However, when a thin oblique line having a pixel width is displayed on the screen, it passes through only either the alignment domains (A) 2 or (B) 3, so that the viewing angle dependence cannot be improved.

In order to form the alignment domains (A) 2 and (B) 3 on the resin film 1 in a checkered pattern, a resist pattern is formed on the resin film 1 by a photolithography method, and then ion beams or the like are applied thereto. However, the photolithography method requires a repeat of steps of applying resist, exposing to light, developing, performing an alignment treatment, and removing resist. For this reason, the production of the alignment film 4 is time consuming and costly, and an alignment surface of the film 4 may possibly be damaged in the course of removing resist. Thus, the photolithography method has drawbacks.

In order to solve these problems, it is preferable to use a mask having a predetermined opening pattern rather than a photoresist. Specifically, a mask is put on the resin film 1 to perform an alignment treatment. Through the opening portions of the mask, the molecules of the resin film 1 are partly aligned in a predetermined direction, and the different alignment domain of the film is shielded by the mask. In order to form the aforementioned alignment film 4, there is need to form a checkered mask having apertures for exposing the alignment domains (A) 2 and shielding portions for shielding the alignment domains (B) 3. However, when the aperture ratio of an LCD is high and a pixel pitch is 200 μ or so, it is necessary that a joint portion between the rectangular shielding portions of the mask that shield the alignment domains (B) 3 is 10 μ or less. However, it is quite difficult to produce such a mask having the size of a liquid crystal panel in high accuracy.

One approach to solve the aforementioned difficulties in producing a checkered mask is, for example, to align alignment domains having the same alignment properties in a row or in a column on a pixel by pixel basis or on a sub-pixel by sub-pixel basis in the case of a color display, as shown in FIG. 11. In this case, a mask having slit apertures for exposing the alignment domains (A) 2 and shielding portions for shielding the alignment domains (B) 3 is formed, for example. However, such a mask having the slit apertures and shielding portions (widths of the shielding portion and the slit aperture: several 10 μ length: several 100 mm) over the whole alignment film is low in strength. In addition, when an LCD is used for a computer, a line having only a pixel width may possibly be displayed. In this case, the line is displayed using either the alignment domains (B) 2 or the alignment domains (B) 3, so that a viewing angle characteristic of the line cannot be improved.

An object of the present invention is to provide a liquid crystal display having an improved viewing angle dependence of a displayed image even when any line segment, single-color area, or character is displayed.

Another object of the present invention is to provide a mask suitable for forming a plurality of alignment domains having different alignment properties on an alignment film.

SUMMARY OF INVENTION

Accordingly, a feature of the present invention is a liquid crystal display that includes an alignment film having first alignment subdomains with a first alignment property and second alignment subdomains with a second alignment property different from the first one. In the alignment film, the first alignment subdomains and the second alignment subdomains are arranged in a matrix so that both of them are included in every line extending across the matrix.

Another feature of the present invention is a mask used for forming an alignment film having first alignment subdomains with a first alignment property and second alignment subdomains with a second alignment property different from the first one. In the alignment film, the first alignment subdomains and the second alignment subdomains are so arranged in a matrix that both of them are included in every line extending across the matrix. The mask of the present invention comprises a plurality of apertures for forming first alignment domains consisting of the first alignment subdomains with the first property, and a shielding portion for shielding a portion where a second alignment domain consisting of the second alignment subdomains with the second property is to be formed. Each of the apertures has a shape corresponding to a predetermined combination of the first alignment subdomains. The shielding portion is physically continuous. The apertures and the shielding portion are so formed that every line extending across the mask passes through at least one of the apertures and the shielding portion.

Still another feature of the present invention includes a method for producing a liquid crystal panel having a pair of substrates facing each other and having aligenment films on their facing surfaces comprises the steps of: preparing a first substrate and a second substrate each having, on one of its surfaces, a base film which is later turned into an alignment film by alignment treatment; preparing a mask having a plurality of apertures for forming first alignment domains consisting of first alignment subdomains with a first property and a shielding portion for shielding a portion where a second alignment domain consisting of second alignment subdomains with a second property is to be formed; subjecting the base film of the first substrate to alignment treatment from a predetermined direction; placing the mask on the surface of the base film of the first substrate; subjecting the base film on the first substrate exposed through the apertures of the mask to alignment treatment from a direction perpendicular to the predetermined direction; subjecting the base film of the second substrate to alignment treatment from the predetermined direction; placing the mask upside down on the base film of the second substrate; and subjecting the base film of the second substrate to alignment treatment from the direction perpendicular to the predetermined direction.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

FIG. 1(a) is a schematic diagram showing an example of an alignment film of the present invention, and FIG. 1(b) is a schematic diagram showing a basic pattern of the alignment film shown in FIG. 1(a).

FIG. 2(a) is a schematic diagram showing another example of the alignment film of the present invention, and FIGS. 2(b) and 2(c) re achematic diagram showing a basic pattern of the alignment film shown in FIG. 2(a).

DETAILED DESCRIPTION

Figure 3A:
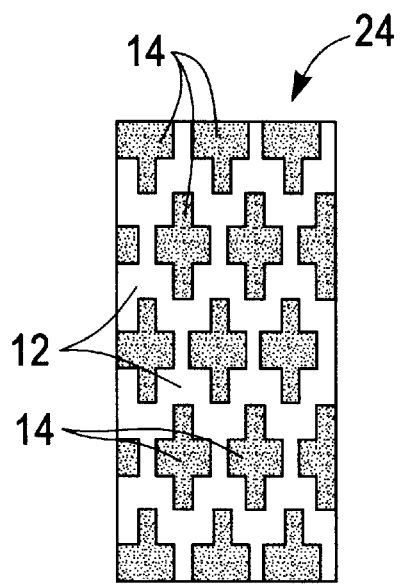
FIG. 3(a) is a schematic diagram showing still another example of the alignment film of the present invention.

Next, embodiments of the liquid crystal display, the mask, and the method for producing the liquid crystal display according to the present invention will be hereinafter described in detail with reference to the accompanying drawings.

In the LCD, one dot is displayed on the screen using one pixel, and in the case of a color display, one dot is displayed on the screen using three sub-pixels. One alignment subdomain is composed of one or more pixels or one or more sub-pixels. One alignment domain is composed of one or more alignment subdomains. An alignment property generally depends on the kind of a liquid crystal to be used. However, in the case of twisted nematic liquid crystals, the alignment property is determined by a combination of a molecular orientation and a pretilt angle. It is essential only that the two or more types of alignment subdomains are included in at least any line segments capable of being displayed by an LCD.

When a line is displayed on the screen of the LCD using a sequence of pixels having a minimum line width, the sequence of pixels includes two or more different types of alignment subdomains, even if one pixel constitutes one alignment subdomain or even if a plurality of pixels constitute one alignment subdomain. Therefore, any line segment, single-color area, or character is displayed on the screen of the LCD using at least two types of alignment subdomains having different alignment properties, so that a viewing angle dependence of a displayed image can be improved.

A shielding portion of a mask is physically continuous, and the minimum width of the shielding portion is equal to the width of the alignment subdomain. Therefore, regardless of the size and the position of the mask, the strength of the mask can be maintained, so that the mask can be easily produced and can be repeatedly used. In addition, a method for performing alignment treatment is not limited to the radiation of atomic beams or the like, but a rubbing method may be used in which external forces are mechanically applied to the mask.

A method for producing a liquid crystal display according to the present invention makes it possible to produce a pair of alignment films having at least two types of alignment domains easily by the same alignment treatment except that the mask is placed upside down in one of the treatments. Particularly, the radiation of atomic beams or the like makes it possible to form accurate alignment films having a fine alignment pattern.

In the liquid crystal display of the present invention, first alignment subdomains and second alignment subdomains are so arranged in a matrix that both of them are always included in every line extending across the matrix. Therefore, any line segment, single-color area, or character is displayed on the screen of the LCD using at least two types of alignment subdomains having different alignment properties, so that a viewing angle dependence of a displayed image can be improved.

For example, as shown in FIG. 1(a), an alignment film 10 of the liquid crystal display according to the present invention has first alignment subdomains 6 having a first alignment property and second alignment subdomains 8 having a second alignment property different from the first alignment property, and the first alignment subdomains 6 and the second alignment subdomains 8 are so arranged in a matrix that both of them are always included in every line extending across the matrix. A first alignment domain 14 is composed of one or more first alignment subdomains 8, and a second alignment domain 12 is composed of one or more second alignment subdomains 6. In this alignment film 10, the alignment pattern consisting of alignment domains 12 and 14 can be formed by a repetition of a basic pattern 16 shown in FIG. 1(b), which consists of a predetermined combination of the first and second alignment subdomains 8 and 6.

In general, the size of one alignment subdomain 6 or 8 corresponds to that of one pixel which is one unit to be displayed on the screen, but it may correspond to the size of two pixels. In the case of a color display, the size of one alignment subdomain 6 or 8 may correspond to the size of one of three sub-pixels, or the size of a combination of two or three sub-pixels. These pixels or sub-pixels are arranged in a matrix. In accordance with the pixels and sub-pixels, the alignment subdomains 6 and 8 are arranged in a similar way. The subdomains 6 and 8 are unit alignment areas for constituting the alignment domains 12 and 14.

The alignment film 10 can be formed by subjecting a base film such as a resin film made of polyimide resin or the like, or an inorganic film made of carbon film or the like to an alignment treatment. In general, the base film can be formed by forming a transparent electrode made of ITO (indium tin oxide) or the like on a transparent substrate like a glass substrate, and subsequently applying resin on the transparent electrode, or covering the transparent electrode with an inorganic matter. Specifically, when a polyimide resin film is used as a base film, the alignment film is formed by covering an electrode layer with polyamide resin, which is a precursor of polyimide resin, and subsequently by imidizing it. Alternatively, when an inorganic film is used as a base film, the following materials can be used to form an alignment film: hydrogenated diamond-like carbon, amorphous hydrogenated silicon, SiC, $SiO_2$, glass, $Si_3N_4$, $Al_2O_3$, $CeO_2$, $SnO_2$, $ZnTiO_2$, or the like. The film can be formed on the substrate by evaporation, sputtering, ion beam deposition, chemical vapor deposition, plasma enhanced chemical vapor deposition (PECVD) and so forth.

It should be understood that any type of methods caouldbe used for forming two types of alignment domains on the base film, so long as two different types of alignment domains 12 and 14 having different alignment properties are formed on a predetermined arrangement pattern.

The alignment film 10 can be aligned using a rubbing method. However, the most preferable method is a method of irradiating the film with atomic beams, ion beams, electron beams, ultraviolet rays, or the like, in which a predetermined molecular orientation and a predetermined pretilt angle can be reliably achieved in accordance with a predetermined fine alignment pattern. When the base film is an inorganic film, an atomic structure of an alignment film can be aligned using atomic beams, ion beams, or the like. Among them, atomic beams are most preferably used. Since ion beams carry positive or negative electrical charges, the alignment film may be charged and the beams may not be stably applied in a predetermined direction. On the contrary, the atomic beams are electrically neutral, so that they are more preferably used than the ion beams.

The alignment film 10 comprises two types of alignment domains 12 and 14. In the alignment domain 12, liquid crystal molecules are oriented in the same direction at a predetermined pretilt angle. In the alignment domains 14, liquid crystal molecules are oriented in the direction 90-degree different from the molecular orientation in the alignment domain 12 at the predetermined pretilt angle. For example, in the case of twisted nematic (TN) liquid crystal, the liquid crystal molecules in the alignment domain 12 of the upper substrate are preferably oriented in a 45-degree direction with respect to the horizontal axis of the substrate (an azimuth angle of 0 degree). In this case, the liquid crystal molecules in the alignment domain 12 of the lower substrate, which corresponds to the alignment domain 12 of the upper substrate, are oriented in a 135-degree direction with respect to the horizontal axis of the substrate. In other words, the liquid crystal molecules in the alignment domain 12 of the upper substrate are twisted by 90 degrees with respect to the molecular orientation in the alignment domains 12 of the lower substrate. A viewing angle dependence is particularly large in a 90-degree direction and in a 180-degree direction, and a maximum value and a minimum value are obtained in these directions.

On the other hand, the liquid crystal molecules in the alignment domains 14 of the lower substrate iarealigned in a 225-degree direction. In this case, the liquid crystal molecules in the alignment domains 14 of the upper substrate, which corresponds to the alignment domains 14 of the lower substrate, are oriented in a 315-degree direction with respect to the horizontal axis. In other words, the alignment direction of the upper layer is twisted at an angle of 90 degrees with respect to the molecular orientation of the lower substrate. In this case, viewing angle dependence is particularly large in a 90-degree direction and in a 180-degree direction, and a maximum value and a minimum value are obtained in these directions. Thus, there exist two different types of alignment domains 12 and 14 having different viewing angle dependences in a display portion of the LCD where lines or the like are displayed, so that the viewing angle dependence of this display portion can be improved.

The alignment domains 12 and 14 are so arranged that any line displayed on the screen passes through both the alignment domains 12 and 14 formed on the alignment film 10. The "line" used herein means any straight line such as horizontal, vertical, and oblique lines displayed all across the alignment film 10 and does not include a short line segment displayed partly on the alignment film 10. For example, as shown in FIG. 1(*a*), the first row of the alignment film 10, which is displayed as a horizontal line on the screen, consists of alignment subdomains 6, 8, 6, 6, 6, 8, 8, 6 arranged in this order from the left. On the other hand, the first column of the alignment film 10, which is displayed as a vertical line on the screen, consists of alignment subdomains 6, 8, 6, 6, 8, 6, 6, 8, 8, 8, 8, 6 arranged in this order from the top.

Thus, any straight line includes both the first alignment subdomains 8 and the second alignment subdomains 6, so that viewing angle dependence can be improved. It is the most preferable that the first and the second alignment subdomains 8 and 6 included in a line, are always arranged in alternating sequence. However, it is impossible that all the line includes the first and the second alignment subdomains 8 and 6 arranged in alternating sequence. Thus, the first and the second alignment subdomains 8 and 6 are so arranged that any line includes at least both of them.

The ratio of the area of the first alignment subdomains 8 to the area of the second alignment subdomains 6 which are included in a row having a minimum line width of a horizontal direction of a matrix or in adjacent two rows is about 30 to 70%, preferably about 45 to 55%, and most preferably 50%. The ratio of the area of the first alignment subdomains 8 to the area of the second alignment subdomains 6 which are included in a column having a minimum line width of a vertical direction of a matrix or in adjacent two columns is about 30 to 70%, preferably about 45 to 55%, and most preferably 50%. The ratio of the total area of the first alignment subdomains 8 to the total area of the second alignment subdomains 6 is about 30 to 70%, preferably about 45 to 55%, and most preferably 50%.

The arrangement of the first alignment subdomain 8 and the second alignment subdomain 6 is not particularly limited, so far as the above conditions are satisfied. However, every time the size of the alignment film 10 is changed, the redesign of the arrangement of the first and the second alignment subdomains 8 and 6 is required. Therefore, as shown in FIG. 1(b), it is preferable that the alignment domain pattern of the film 10 is composed of a repetition of a basic pattern 16 consisting of a predetermined combination of the first and the second alignment subdomains 8 and 6.

The liquid crystal display of the present invention comprises a pair of thus-composed alignment films. These two films are arranged to face each other with liquid crystal material sealed between these two alignment films. Since no line is composed of one type of alignment domains alone, viewing angle dependence is improved and the color and contrast of the line is not almost changed with the viewing angle.

While one embodiment of the alignment film and the liquid crystal display comprising the alignment film according to the present invention, it should be understood that the present invention be not limited to this embodiment.

For example, as shown in FIG. 2(a), the two types of alignment domains 12 and 14 of an alignment film 18 are so arranged that all the alignment domains 14 except the edge portions of the film 18 are shaped like a symmetrical cross. The cross-shaped alignment domain 14 is formed by two columns of four second alignment subdomains (8) and two columns of two second alignment subdomains (8), wherein the latter columns each are attached to the center of the either side of the former columns. These cross-shaped alignment domains are provided in a staggered configuration. Such an arrangement pattern on the alignment film 18 can be obtained by a combination of basic patterns 20 shown in FIG. 2(b) and flipped patterns thereof, or by a combination of basic patterns 22 shown in FIG. 2(c) and flipped patterns thereof.

In this arrangement pattern on the alignment film 18, the area ratio of the alignment domains 12 to the alignment domains 14 is 50 to 50. In any one column, the area ratio of the first alignment subdomains 8 and the second alignment subdomains 6 is 50 to 50. In any two adjacent rows, the area ratio of the first alignment subdomain 8 and the second alignment subdomain 6 is 50 to 50. Therefore, even if the liquid crystal display produced using this alignment film 18 is seen from different angle, there is no change in contrast, and a wide range of viewing angles can be achieved.

Figure 3B:
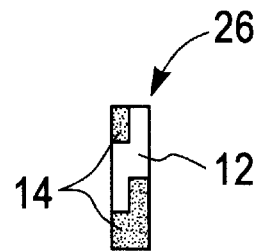
FIG. 3(b) is a schematic diagram showing a basic pattern of the alignment film shown in FIG. 3(a).

Alternatively, as shown in FIG. 3(a), the two types of alignment domains 12 and 14 of an alignment film 24 are so arranged that the alignment domains 14 each are shaped like a symmetrical cross smaller than the ones shown in FIG. 2(a). Such an arrangement pattern on the alignment film 24 can be obtained by a combination of basic patterns 26 shown in FIG. 3(b) and flipped patterns thereof. In this embodiment, the same effect as produced in the arrangement pattern shown in FIG. 2(a) can be achieved.

While embodiments of the alignment film of the present invention have thus been described, it is not limited to the above embodiments. It is sufficient for an alignment film of the present invention to comprise: first alignment subdomains having a first alignment property; and second alignment subdomains having a second alignment property different from the first one, wherein the first alignment subdomains and the second alignment subdomains are so arranged in a matrix that both of them are always included in every line extending across the matrix. Therefore, there are a myriad of alignment films having two types of alignment domains that meet the above requirements. Thus, an arbitrary line of any direction always traverses two different types of alignment domains, so that viewing angle dependence can be improved.

The aforementioned two types of alignment domains 12 and 14 of the alignment film 10 can be achieved by known techniques. For example, they can be formed using photoresist. The method using resist requires complicated steps and is costly. Therefore, a method using a mask having no such drawbacks is most preferably employed.

In this embodiment, the portions corresponding to the alignment domains 14 are apertures. Therefore, in a mask 28 shown in FIG. 4(a), the diagonally shaded portions are apertures 30 and all other portions constitute a shielding portion 32 made of a material of the mask.

Figure 4A:
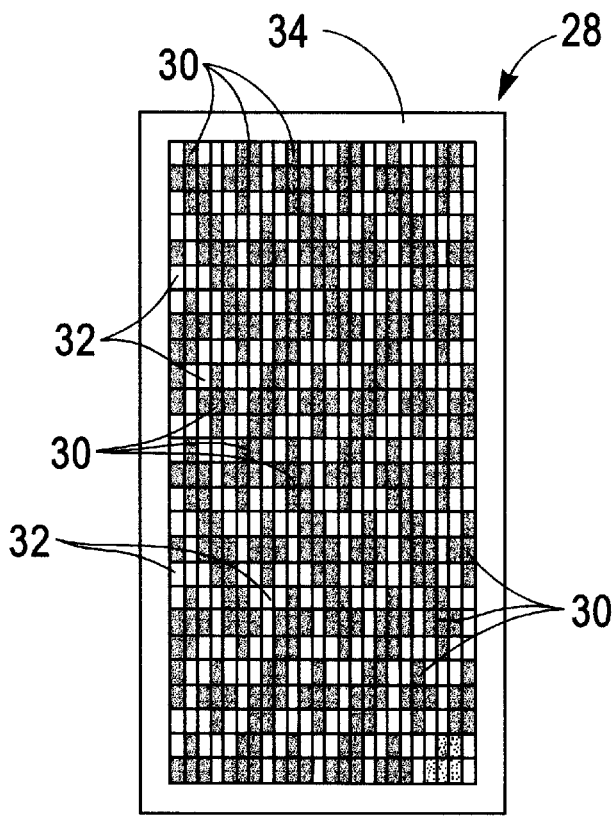
FIG. 4(a) is a schematic diagram showing an example of a mask for forming the alignment film shown in FIG. 1(a)

The mask 28 shown in FIG. 4(a) comprises: a frame portion 34; apertures 30 for forming the first alignment domains 14 consisting of the first alignment subdomains 8 having the first property; and a shielding portion 32 for shielding a portion where the alignment domain 12 consisting of the second alignment subdomains 6 having the first property is to be formed. Each of the apertures 30 has a shape corresponding to a predetermined combination of the first alignment subdomain 8. The shielding portion 32 is physically continuous. The apertures 30 and the shielding portion 32 are so formed that every line extending across the mask 28 always passes through at least one of apertures 30 and the shielding portion 32. The minimum width of the shielding portion 32 of this mask 28 is the width of the first alignment subdomain 6. The widths of the first and second alignment subdomains 8 and 6 are about 80 μ, for example. Therefore, the minimum line width of the shielding portion 32 is about 80 μ, so that the mask 28 can be easily produced. In the mask 28, the shielding portion 32 having a line width wider than a certain width are spread in all directions. Therefore, even if a large-sized mask is produced, the mask 28 may keep a sufficient strength in its center portion with a small amount of distortions, and can be used repeatedly for a long period of time.

Figure 4B:
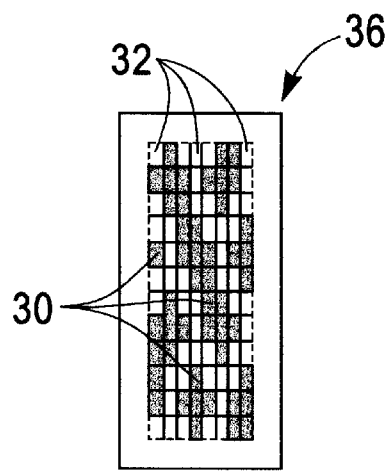
FIG. 4(b) is a schematic diagram showing a basic pattern of the alignment film shown in FIG. 4(a).

Such a mask pattern is formed by a repetition of a basic pattern 36 shown in FIG. 4(b). The minimum line width of this basic pattern 36 is the width of one alignment subdomain 6 (specifically, about 80 μ), so that the basic pattern 36 and the required size of the mask 28 can be easily formed. Particularly, even if a large-sized mask is produced, the mask 28 can keep a sufficient strength in its center portion. In the basic pattern 36, the ratio of the total area of the apertures 30 and the total area of the shielding portion is 50 to 50. Therefore, the mask 28 having a 50-to-50 aperture-to-shielding portion ratio can be produced by a combination of basic patterns 36.

Next, a method for producing a liquid crystal display using the mask of the present invention will be described below, while focusing on steps of producing an alignment film. As an example, a method for producing the alignment film 10 shown in FIGS. 1(a) and (b) using the mask shown in FIGS. 4(a) and (b) will be described.

Figure 5A:
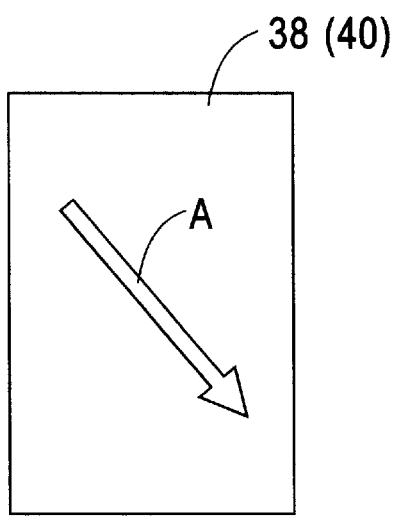
FIGS. 5(a) and 5(b) ere achematic diagram showing a process for forming an alignment film on a lower substrate, and FIGS. 5(c) and 5(d) ere achematic diagram showing a process for forming an alignment film on an upper substrate.

In the liquid crystal display, a cell gap formed between the lower substrate and the upper substrate is filled with liquid crystal material. To form the lower substrate, a driving device such as a TFT (thin film transistor) array and electrodes are formed on a glass substrate or the like, and an alignment film is formed on the uppermost layer thereof. An alignment film 40 on the lower substrate is formed by first applying atomic beams to the whole surface of a base film 38 in the direction of the arrow A, as shown in FIG. 5(a). The direction A of applying the atomic beams is so set that molecular orientation is obtained in 135-degree direction with respect to the horizontal axis (azimuth angle of 0 degree).

Figure 5B:
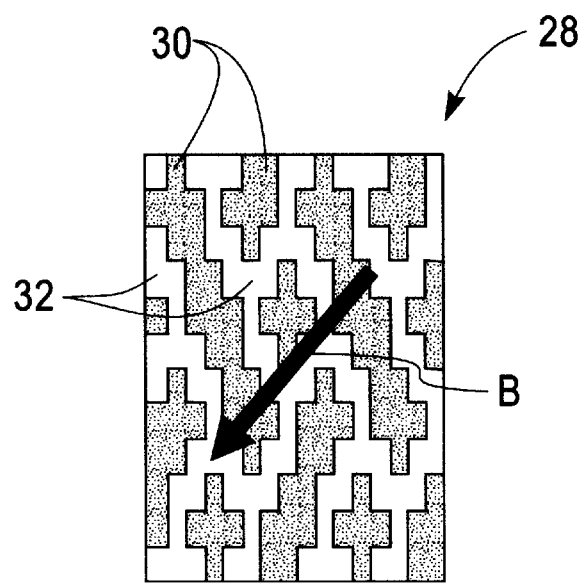

Next, as shown in FIG. 5(b), the mask 28 shown in FIG. 4(a) is placed on the uniformly oriented alignment film 40. Then, atomic beams are applied onto the mask from the direction perpendicular to the aforementioned 135-degree direction, that is, the 45-degree direction (arrow B) with respect to the horizontal axis (azimuth angle of 0 degree). The molecular orientation on the surface of the alignment film 40 under the shielding portion 32 is not changed through the irradiation of atomic beams, but the molecular orientation of the film 40 exposed through the apertures 30 is changed from 135-degree to the 45-degree direction with respect to the horizontal axis (azimuth angle of 0 degree), while maintaining a predetermined pretilt angle.

When the mask 28 is removed, the alignment film having alignment domains 12 and 14 arranged in the desired pattern as shown in FIG. 1(a) can be obtained.

Figure 5C:
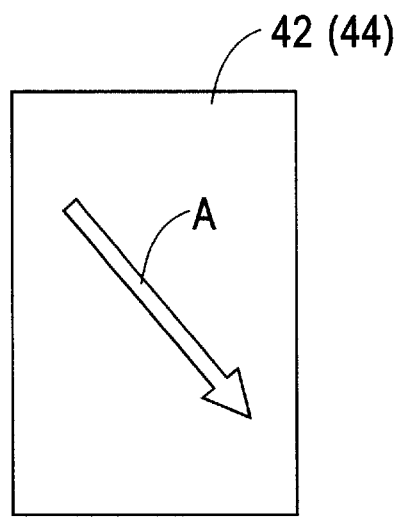

On the other hand, to form the upper substrate, color filters and electrodes are formed on a transparent substrate such as a glass substrate, and an alignment film is formed on the uppermost layer thereof. In the same manner as the above, atomic beams are first applied to the whole surface of a base film 42 in the direction of the arrow A to form the alignment film 44 as shown in FIG. 5(c). The direction A of applying the atomic beams is set in the same manner as the above.

Figure 5D:
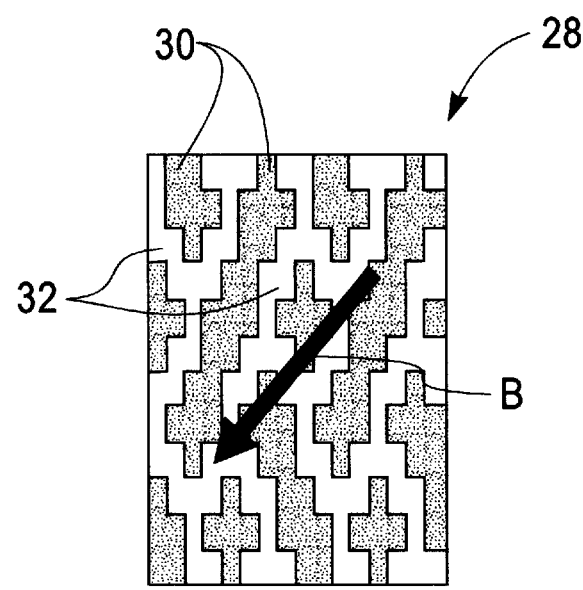

Then, the mask 28 is turned upside down or rotated 180 degrees about vertical center line, as shown in FIG. 5(d) and placed on the alignment film 44 of the upper substrate. In the same manner as the above, atomic beams are applied onto the mask 28 from the direction perpendicular to the aforementioned 135-degree direction, that is, the 45-degree direction (arrow B) with respect to the horizontal axis (azimuth angle of 0 degree). The orientation of the alignment film 44 under the shielding portion 32 of the mask 28 is not changed through the irradiation of atomic beams, but the molecular orientation of the alignment film 44 exposed through the apertures 30 is changed from 135-degree to 45-degree direction (arrow B) with respect to the horizontal axis (azimuth angle of 0 degree), while maintaining the predetermined pretilt angle. When the mask 28 is removed, the alignment film 44 has an alignment pattern corresponding to the pattern in FIG. 5 (b) flipped from side to side or turned upside down.

Figure 6:
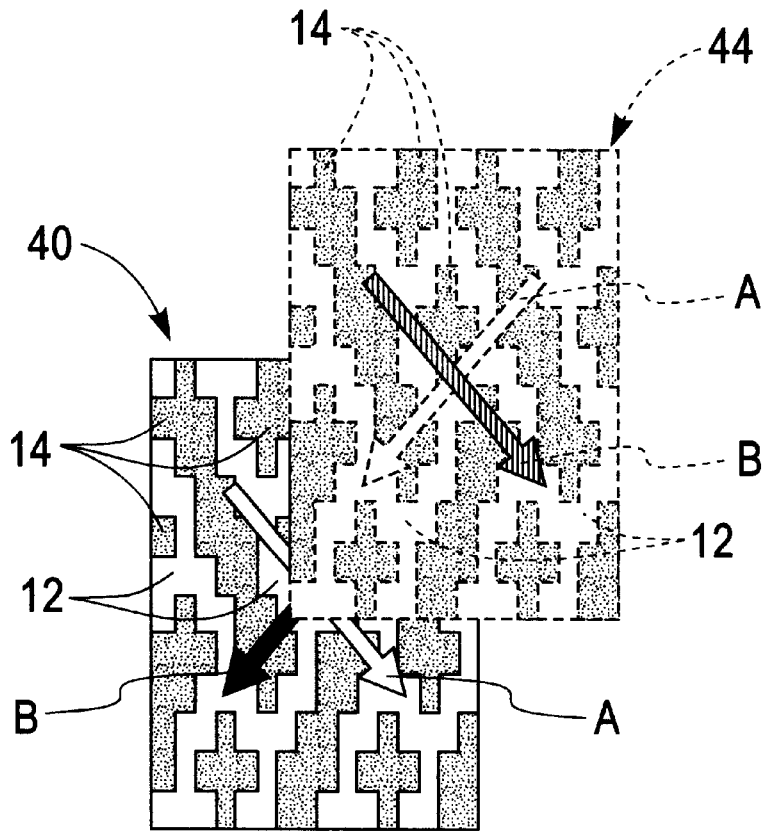
FIG. 6 is a schematic diagram for explaining alignment domains and alignment directions in the case of putting the alignment film of the upper substrate on the alignment film of the lower substrate.

As shown in FIG. 6, the lower and upper substrates are assembled such that the alignment film 40 of the lower substrate and the alignment film 44 of the upper substrate face each other, are spaced by a predetermined cell gap, and their alignment patterns correspond to each other. After sealing the edges of the alignment films 40 and 44, twisted nematic (TN) liquid crystal material is filled into the cell gap, and then the liquid crystal display is produced by a general method.

Figure 7:
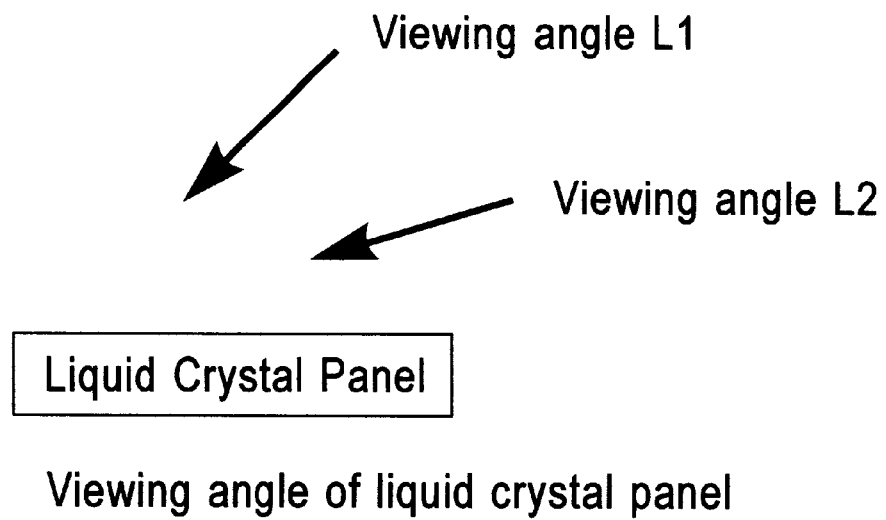
FIG. 7 is an explanatory view showing a viewing angle at which a viewer sees a liquid crystal display.
Figure 8A:
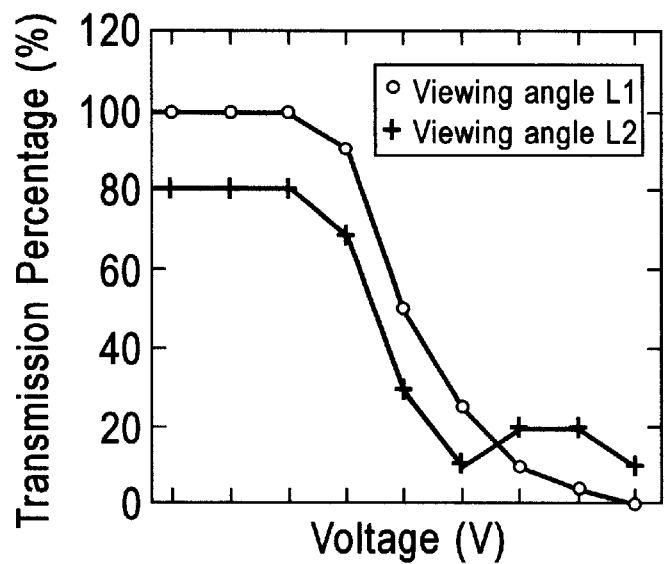
FIG. 8(a) is a diagram showing a viewing angle characteristic of a single-domain LCD.
Figure 8B:
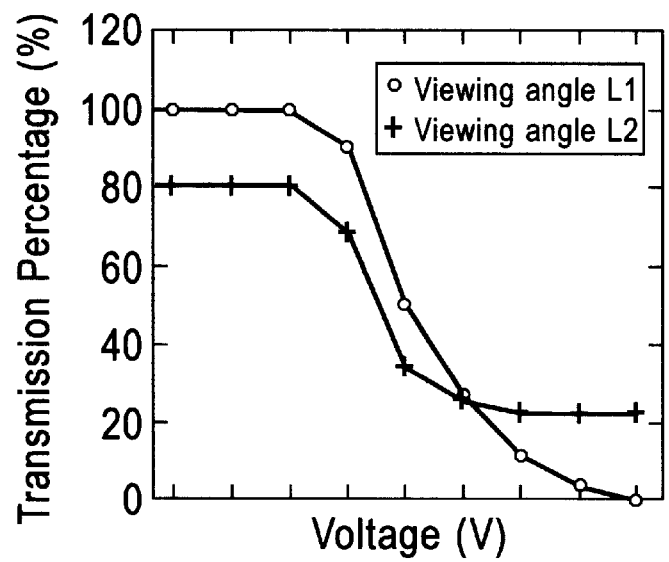
FIG. 8(b) is a diagram showing a viewing angle characteristic of a two-domain LCD.
Figure 9:
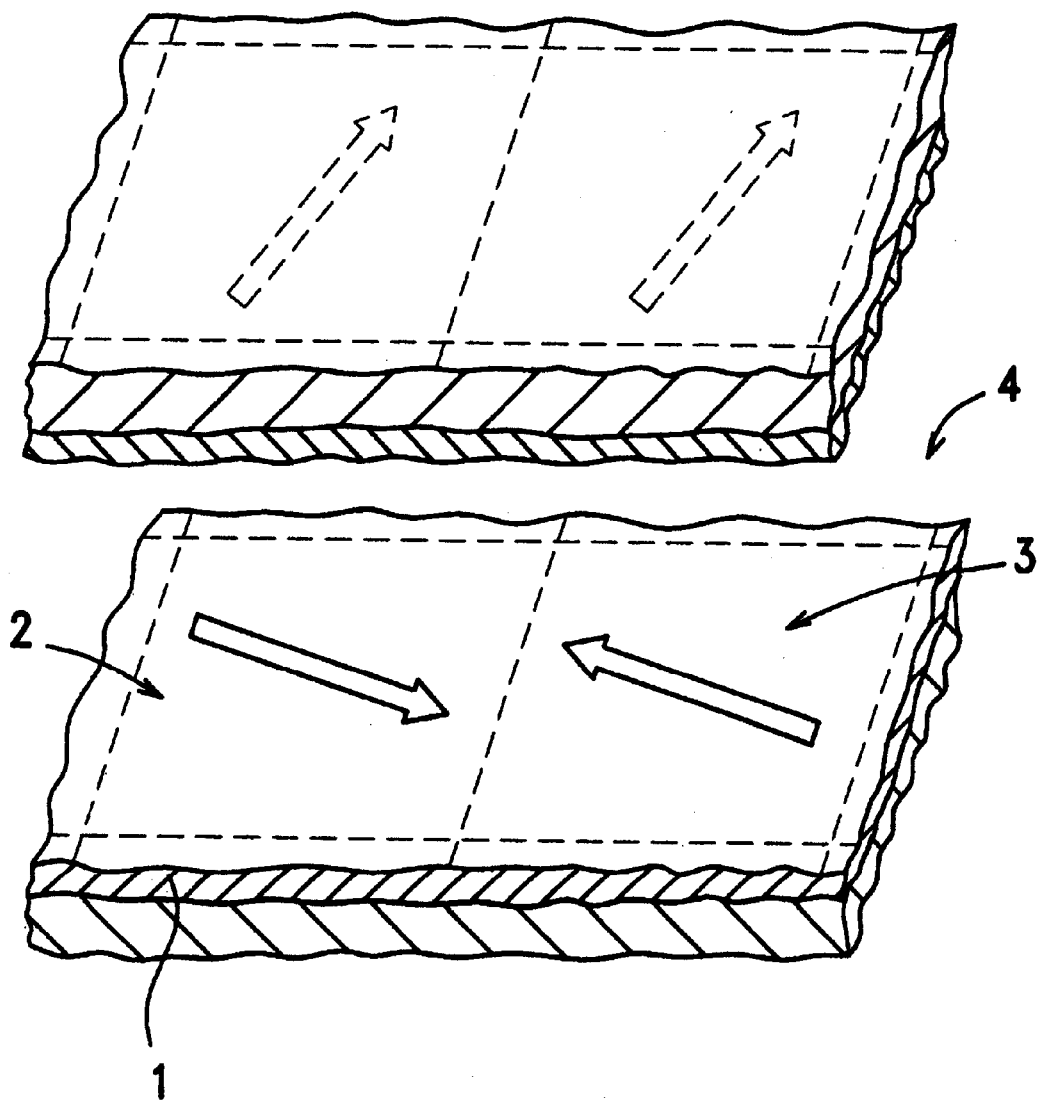
FIG. 9 is a schematic diagram showing a divisional alignment method for improving a viewing angle dependence.
Figure 10:
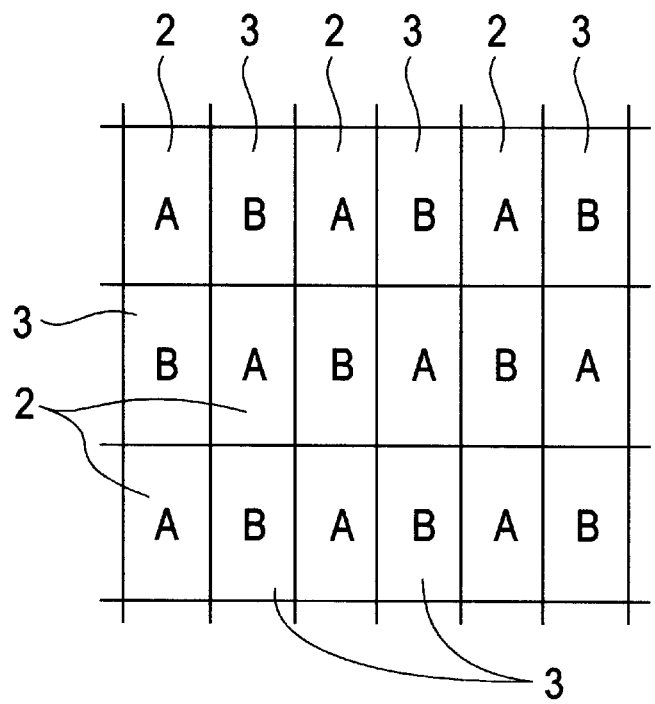
FIG. 10 is a schematic diagram showing prior art method for forming two types of alignment domains.
Figure 11:
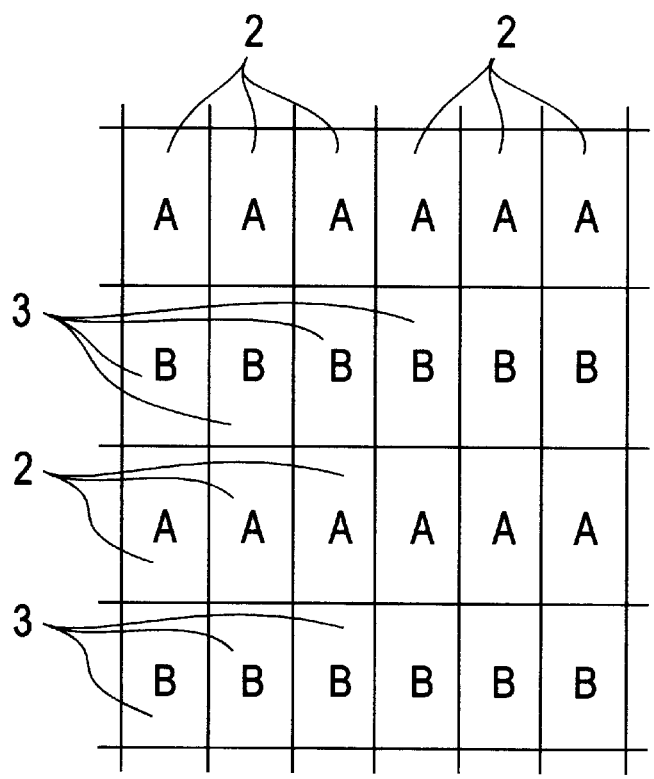
FIG. 11 is a schematic diagram showing another prior art method for forming two types of alignment domains.

The thus-obtained liquid crystal display comprises two types of alignment domains 12 and 14 having different alignment properties. In the case of a conventional single-domain LCD, when the viewing angle with respect to the normal to the liquid crystal panel increases from L1 to L2 as shown in FIG. 7, so-called reverse tilt phenomenon in which contrast is reversed may occur as shown in FIG. 8(a). In the case of the liquid crystal display of the present invention, however, since two types of alignment domains having different alignment properties are formed in an intermingled manner over the display area, the reverse tilt phenomenon does not occur irrespective of viewing angles, so that viewing angle characteristic can be improved.

While the method for producing a liquid crystal display according to the present invention has thus been described, it is not limited to the aforementioned method. For example, although atomic beams have been applied to the base film 38 of the lower layer or the base film 42 of the upper film as shown in FIG. 5 to perform the blanket alignment treatment, alignment treatment may be performed by rubbing, or applying atomic beams, ion beams, or ultraviolet rays when the base films 38 and 42 are resin films. When the base films 38 and 42 are inorganic films such as carbon films, alignment treatment may be performed using ion beams such as argon ion beams, or electrically-neutral atomic beams thereof. Further, the alignment treatment through the apertures 30 may be performed by applying atomic beams, ion beams, or ultraviolet rays.

The liquid crystal display according to the present invention is not limited to a twisted nematic liquid crystal display, but may be a vertical alignment or an in-plane switching liquid crystal display. In these cases, molecular orientation, pretilt angle, and liquid crystal material to be filled may be different from those in the former case.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompasses any and all embodiments within the scope of the following claims

What is claimed is:

1. A method for producing a liquid crystal display having a pair of substrates facing each other and having aligenment films on their facing surfaces, comprising the steps of:

preparing a first substrate and a second substrate each having, on one of its surfaces, a base film which later turns into an alignment film by alignment treatment;

preparing a mask having a plurality of apertures for forming first alignment domains consisting of first alignment subdomains with a first property and a shielding portion for shielding a portion where a second alignment domain consisting of second alignment subdomains with a second property is to be formed, subjecting the base film of the first substrate to alignment treatment from a predetermined direction, placing the mask on the base film of the first substrate;

subjecting the base film of the first substrate exposed through the apertures of the mask to alignment treatment from a direction perpendicular to the predetermined direction;

subjecting the base film of the second substrate to alignment treatment from the predetermined direction;

placing the mask upside down on the base film of the second substrate; and subjecting the base film of the second substrate to alignment treatment from the direction perpendicular to the predetermined direction.

2. The method for producing a liquid crystal display according to claim 1, wherein said base film is made of material selected from a group consisting of hydrogenated diamond-like carbon, amorphous hydrogenated silicon, SiC, $SiO_2$, glass, $Si_3N_4$, $Al_2O_3$, $CeO_2$, $SnO_2$, and $ZnTiO_2$.

3. The method for producing a liquid crystal display according to claim 1, wherein said steps of subjecting the base films comprise applying atomic beams, ion beams or ultraviolet rays.

4. The method for producing a liquid crystal display according to claim 1, wherein said mask is used for forming an alignment film having first alignment subdomains with a first alignment property and second alignment subdomains with a second alignment property different from the first property, wherein said first alignment subdomains and said second alignment subdomains are so arranged in a matrix that both of them are included in every line extending across the matrix;

each of said apertures has a shape corresponding to a predetermined combination of the first alignment subdomains;

said shielding portion is physically continuous; and said apertures and said shielding portion are so formed that every line extending across the mask passes through at least one of said apertures and said shielding portion.

* * * * *